(12) United States Patent
Kulangara et al.

(10) Patent No.: US 6,910,365 B1
(45) Date of Patent: Jun. 28, 2005

(54) SUSPENSION SHOCK CHARACTERISTIC TEST METHOD AND APPARATUS

(75) Inventors: Sivadasan Kulangara, Temecula, CA (US); Amanullah Khan, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 0 days.

(21) Appl. No.: 10/730,176

(22) Filed: Dec. 8, 2003

(51) Int. Cl.[7] ............................................. G01P 15/00
(52) U.S. Cl. .................................................... 73/12.01
(58) Field of Search .................... 73/12.01; 360/244.8, 360/78.11

(56) References Cited

U.S. PATENT DOCUMENTS 6,667,856 B2 * 12/2003 Danielson et al. ....... 360/244.8
6,683,744 B2 * 1/2004 Takano et al. ........... 360/78.11

* cited by examiner

Primary Examiner—Max Noori
Assistant Examiner—Octavia Davis
(74) Attorney, Agent, or Firm—Louis J. Bachand

(57) ABSTRACT

An apparatus and method for determining the shock characteristic of a suspension having a proximate portion, a distal portion and a spring portion therebetween has a rotatable structure having a mount for the suspension base portion such that the suspension distal portion is cantilevered over the rotatable structure, and a sensor carried on the rotatable structure for sensing the displacement of the suspension distal portion relative to the suspension proximate portion under shock load from centrifugal force imparted to the suspension by the rotatable structure. The shock characteristic value is determinable from the displacement value.

19 Claims, 1 Drawing Sheet

SUSPENSION SHOCK CHARACTERISTIC TEST METHOD AND APPARATUS

RELATED APPLICATION

Not Applicable.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to disk drive suspensions, and, more particularly, to suspension load beam designs that minimize second torsion gains through the aligning of the load beam side profile with the rotation centerline of the suspension.

2. Description of the Related Art

Shock performance, shock characteristic, or "shockability" of a suspension assembly may be defined as the maximum shock the suspension can be subjected to while the slider still maintains its pre-loaded configuration. It is inversely proportional to the 'effective mass' of the assembly. The effective mass of a suspension assembly (M) is the value of a point mass to be positioned at the free end of the suspension so that the moment it generates about the fixed end (mount plate) of the suspension is equivalent to net moment generated by the entire head-suspension assembly. The inverse of the suspension effective mass gives a measure of its shockability.

Methods to determine the 'shockability' of a head suspension assembly have included subjecting the assembly to a shock impulse of known magnitude and measuring the back flexing of the assembly, based on the observation that when an impulse is applied to the suspension mount plate, the free end that carries the head jerks backwards (the suspension is said to back flex) and then returns back to its undisturbed, original and normal position.

In this method, successive shock pulses with incrementally increased magnitudes are applied, and for each shock pulse the magnitude of back flexing of the suspension is recorded. A regression analysis on the pulse values and the back flex values provides a value of shock pulse that corresponds to zero back flexing of the suspension. This value is the shock characteristic or shockability of the suspension assembly.

This test method is prone to a number of uncontrolled variables as set out in the Detailed Description section below that preclude the greatest accuracy and reproducibility of result.

BRIEF SUMMARY OF THE INVENTION

It is an object of the present invention to provide an improved method and apparatus for determining the shock characteristic of a disk drive suspension. It is a further object to provide a shock characteristic test apparatus that serves as well as a spring rate tester, that handles multiple suspensions simultaneously and identically in shock level, that provides a continuous, smooth, repeatable control of shock stimulus (acceleration) levels acceleration, that provides a direct reading of 'shockability' or the shock characteristic, without need of regression analysis, necessary), that is non-destructive and contact-less and is without a sound pollution consequence.

These and other objects of the invention to appear hereinafter are realized in a method for determining the shock characteristic of a suspension having a fixed proximate portion, a cantilevered distal portion and a spring portion therebetween, including subjecting the suspension to a centrifugal force that differentially displaces the distal portion relative to the proximate portion, measuring the displacement of the distal portion under the centrifugal force, and determining the suspension shock characteristic from the displacement.

In this and like embodiments, typically, the method also includes fixing the suspension base portion to a rotatable structure for rotation therewith to provide the centrifugal force, maintaining a sensor opposite the distal portion, and sensing the displacement with the sensor to measure the displacement, engaging the distal portion with a sensor that senses the displacement, supporting the suspension of a rotatable structure, and carrying the sensor on the structure, supporting the suspension by the proximate portion on a rotatable structure in distal portion cantilevering relation, supporting a sensor on the structure in distal portion displacement sensing relation, and sensing displacement of the distal structure under centrifugal force generated by rotation of the structure, and subjecting a plurality of the suspensions to shock characteristic determination simultaneously.

In a further embodiment, the invention provides a method for determining the shock characteristic of a suspension having a proximate portion, a distal portion and a spring portion therebetween, and in which the shock characteristic is a function of the displacement of the distal portion relative to the proximate portion under shock load, including mounting the suspension proximate portion to a rotatable structure while maintaining the suspension distal portion cantilevered from the structure and arranged to be displaced from the structure under centrifugal force a distance that is a function of the suspension shock characteristic, sensing displacement of cantilevered distal portion of the suspension with a sensor that measures the distance of distal portion movement, and determining the suspension shock characteristic from the displacement measurement.

In this and like embodiments, typically, there is also included mounting a sensor on the rotatable structure engaged with the distal portion for rotation with the structure in distal portion displacement sensing relation, mounting a plurality of the suspensions and sensors to the rotatable structure for simultaneous shock characteristic determination, and engaging the sensor with the distal portion for displacement sensing.

In a further embodiment, the invention provides an apparatus for determining the shock characteristic of a suspension having a fixed proximate portion, a cantilevered distal portion and a spring portion therebetween and in which displacement of the distal portion relative to the proximate portion under centrifugal force is a function of the shock characteristic, the apparatus comprising a rotatable structure that mounts the suspension by the proximate portion for rotation therewith under centrifugal force, and a displacement sensor mounted to the rotatable structure in distal portion displacement sensing relation, the sensor sensing the displacement of the distal portion under the centrifugal force.

In this and like embodiments, typically, the apparatus suspension base portion is fixed to the rotatable structure for rotation therewith, the sensor engages the distal portion in displacement sensing relation, the sensor is carried on the rotatable structure, the suspension is supported by the proximate portion fixed on the rotatable structure in distal portion cantilevering relation, the sensor is fixed on the rotatable structure arranged to sense displacement of the distal portion under centrifugal force generated by rotation of the structure, and a plurality of the suspensions is carried on the rotatable structure for shock characteristic determination simultaneously.

In a further embodiment, the invention provides apparatus for determining the shock characteristic of a suspension having a proximate portion, a distal portion and a spring portion therebetween, the apparatus comprising a rotatable structure having a mount for the suspension base portion such that the distal portion is cantilevered over the rotatable structure, and a sensor carried on the rotatable structure for sensing the displacement of the distal portion relative to the proximate portion under shock load from centrifugal force imparted to the suspension from the rotatable structure. In this and like embodiments, typically, the rotatable structure has a plurality of the mounts for mounting a plurality of the suspensions to the rotatable structure.

BRIEF DESCRIPTION OF THE SEVERAL VIEWS OF THE DRAWINGS

The invention will be further described in conjunction with the attached drawings in which.

DETAILED DESCRIPTION

Figure 1:
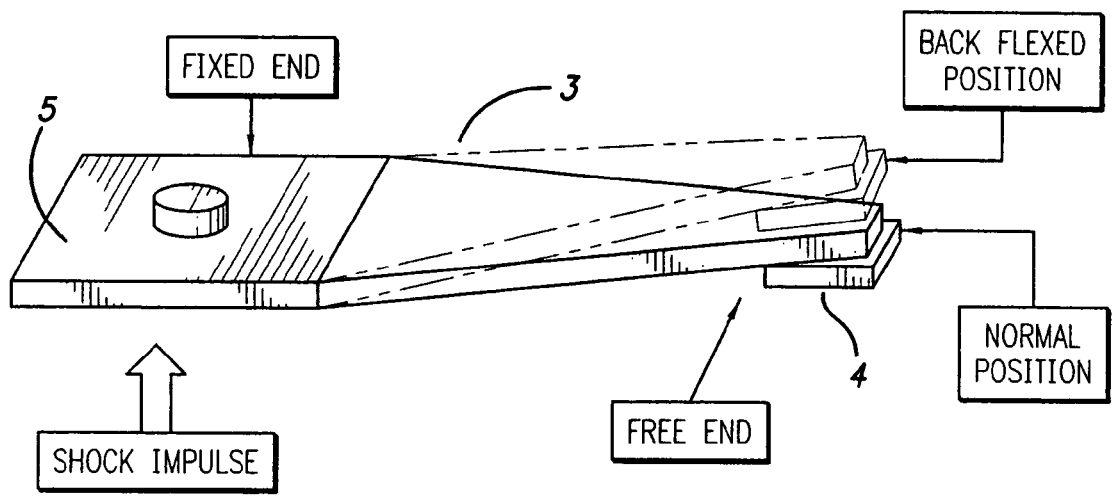
FIG. 1 is a schematic view of a PRIOR ART suspension shock characteristic test apparatus.

The prior art method of measuring the shockability of a suspension 3 is illustrated in the PRIOR ART FIG. 1. In this method, the measure of the magnitude of back flexing is found by measuring the time taken by slider to 'fly' (swing backwards and come back to the normal position). This is logical, since the time taken for the slider 4 to fly will be proportional to the magnitude of back flexing if the spring constant of the assembly holds its value. But problems arise with the measurement of both flight time (result of shock) and shock magnitude (the pulse imparted as shock). Shock impulses are usually administered by dropping a weight (the shock impulse creator) onto the mounting plate 5 of the suspension assembly 3 through a fixed height and allowing it to hit the plate surface, as schematically depicted in FIG. 1. Altering drop height or changing the impact surface hardness can control magnitude and spread of the pulse in theory; however, in practice, it is difficult to achieve a smooth and continuous control over the shock magnitude.

Another problem with the FIG. 1 apparatus is the lack of repeatability in the application of shock impulses. The shock event depends entirely on the nature of impact, successive ones of which may have individually unique characteristics.

Yet another problem with the FIG. 1 apparatus and method is the difficulty of reliably measuring the 'flight time' (of the slider on the fly). When subjected to a shock impulse, the suspension assembly (which can be roughly approximated to a $2^{nd}$ order system) undergoes many oscillations before being completely dampened by the contact surface. Thus, it is hard to define among these successive oscillations a unique flight time associated with each shock event. Then, the shockability value is only obtained after regression analysis of the flight time data.

Further, the FIG. 1 apparatus and method is only difficultly if at all converted to effect simultaneous testing on multiple suspensions.

Finally, in using the FIG. 1 apparatus and method practical difficulties abound including sound pollution from the successive impacts (at least three per test), and the need for the suspension to survive the potentially destructive testing.

Figure 2:
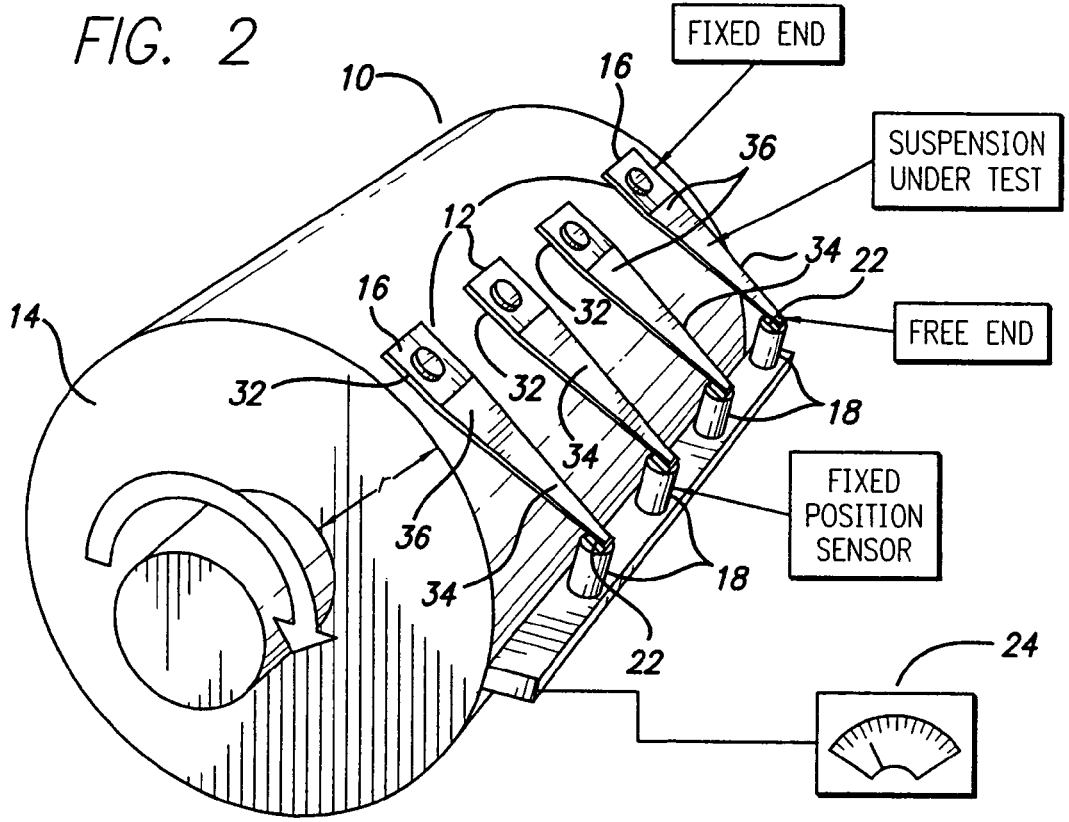
FIG. 2 is a perspective view of the invention suspension shock characteristic test apparatus.

With reference now to the invention apparatus shown in FIG. 2, the apparatus 10 is useful to impart a smooth, continuously variable linear acceleration to the bodies (suspensions 12) mounted on it, without having to shock any part of the set up. A rotor 14 having a radius 'r' and spinning at a constant angular velocity of '$\omega$' imparts a constant linear acceleration of $\omega^2 r$ (directed outwards) to the suspensions 12 which are fixed by their mount plates 16 to the rotor, as shown. Position sensors 18 are mounted on the rotor 14 to monitor the back flexing of the sliders 22. The back flexing, related to '$\omega$', is measured from the slider 22 normal position. This position information is transmitted to a stationary data acquisition system 24 via a set of brushes and slip rings or some wireless means (not shown) as is convenient.

Thus, the accurate value of "$\omega$" corresponding to where the slider starts to 'take off' can be known, and this is converted into linear acceleration data and then shock values as a function of the measured back flexing.

At the dynamic equilibrium condition between the inertial (back flexing) force and the spring (restoring) force, $$\text{Effective mass } (M) \times \text{Linear acceleration } (a) = \text{Spring constant } (K) \times \text{Back flexing } (d) - (1) \quad (1)$$

In equation (1), 'a' and 'd' are the measured variables and 'M' and 'K' are the conditional unknowns. That means, depending on whether we know the values of 'M' or 'K', the second unknown ('K' or 'M' respectively) can be computed. In many cases the designer has a computed value for 'M' and would like to know the experimental value of 'K' or vice versa.

The invention apparatus thus provides for determining the shock characteristic of a suspension 10 having a fixed base or proximate portion 32, a cantilevered distal portion 34 and a spring portion 36. The displacement of the distal portion 34 relative to the proximate portion 32 under centrifugal force imparted by the rotor 14 is a function of the shock characteristic. The apparatus comprises a rotatable structure, rotor 14, that mounts the suspension 10 by its proximate portion 32 for rotation therewith under centrifugal force, and a displacement sensor 18 mounted to the rotatable structure in distal portion displacement sensing relation. The sensor 18 senses the displacement of the distal portion 34, including slider 22, under the centrifugal force.

The apparatus suspension base portion 32 is fixed to the rotatable structure, rotor 14, for rotation therewith; the sensor 18 can engage the distal portion 34 in displacement sensing relation, where contact is unobjectionable, or merely sense changes in distance where there is to be no contact between the sensor 18 and the distal portion. The sensor 18 is preferably but not necessarily carried on the rotatable structure, while the suspension 10 is supported by the proximate portion 32 fixed on the rotatable structure in distal portion 34 cantilevering relation. Typically, as shown, the sensor 18 is fixed on the rotatable structure 14 and arranged to sense displacement of the distal portion under centrifugal force generated by rotation of the structure. A plurality of the suspensions 10 can be carried on the rotatable structure 14 for multiple shock characteristic determinations simultaneously.

Sensor 18 can be of the optical-reflective type in which a light-emitting diode beams light onto the reflective surface of the slider, and the intensity of the reflected signal is sensed by a photo-diode whose output is related to a target's position. Or the sensor 18 can be of the capacitive type in which an electrode is placed parallel to the slider 22 surface so that they together form a capacitor (air being the dielectric). The capacitance of the capacitor is then measured, using a bridge circuit for example. The capacitance is directly related to the spacing between the plates of the capacitor and thus the slider spacing from the sensor is known.

The movement of the suspension distal portion 34 is further indicative of the suspension 10 spring rate so that property is also measured.

In the method for determining the shock characteristic of a suspension 10 having a fixed proximate portion 32, a cantilevered distal portion 34 and a spring portion 36 therebetween, the steps include subjecting the suspension to a centrifugal force that differentially displaces the distal portion relative to the proximate portion, measuring the displacement of the distal portion under the centrifugal force, and determining the suspension shock characteristic from the displacement, e.g. by fixing the suspension base portion to a rotatable structure 14 for rotation therewith to provide the centrifugal force, maintaining a sensor 18 opposite the distal portion, and sensing the displacement with the sensor to measure the displacement, engaging the distal portion physically or optically, or otherwise monitoring its position without engagement, with the sensor that senses the displacement, supporting the suspension on a rotatable structure, and carrying the sensor on the structure, supporting the suspension by the proximate portion on a rotatable structure in distal portion cantilevering relation, supporting a sensor on the structure in distal portion displacement sensing relation, and sensing displacement of the distal structure under centrifugal force generated by rotation of the structure, and subjecting a plurality of the suspensions to shock characteristic determination simultaneously.

The invention thus provides an improved method and apparatus for determining the shock characteristic of a disk drive suspension that serves as well as a spring rate tester, that handles multiple suspensions simultaneously and identically in shock level, that provides a continuous, smooth, repeatable control of shock stimulus (acceleration) levels acceleration, that provides a direct reading of 'shockability' or the shock characteristic, without need of regression analysis), that is non-destructive and contact-less and is without a sound pollution consequence.

The foregoing objects are thus met.

We claim:

1. A method for determining the shock characteristic of a suspension having a fixed proximate portion, a cantilevered distal portion and a spring portion therebetween, including subjecting said suspension to a centrifugal force that differentially displaces said distal portion relative to said proximate portion, measuring the displacement of said distal portion under said centrifugal force, and determining said suspension shock characteristic from said displacement.

2. The method according to claim 1, including also fixing said suspension base portion to a rotatable structure for rotation therewith to provide said centrifugal force.

3. The method according to claim 1, including also maintaining a sensor opposite said distal portion, and sensing said displacement with said sensor to measure said displacement.

4. The method according to claim 1, including also engaging said distal portion with a sensor that senses said displacement.

5. The method according to claim 4, including also supporting said suspension of a rotatable structure, and carrying said sensor on said structure.

6. The method according to claim 1, including also supporting said suspension by said proximate portion on a rotatable structure in distal portion cantilevering relation, supporting a sensor on said structure in distal portion displacement sensing relation, and sensing displacement of said distal structure under centrifugal force generated by rotation of said structure.

7. The method according to claim 1, including also subjecting a plurality of said suspensions to shock characteristic determination simultaneously.

8. A method for determining the shock characteristic of a suspension having a proximate portion, a distal portion and a spring portion therebetween, and in which said shock characteristic is a function of the displacement of said distal portion relative to said proximate portion under shock load, including mounting said suspension proximate portion to a rotatable structure while maintaining said suspension distal portion cantilevered from said structure and arranged to be displaced from said structure under centrifugal force a distance that is a function of the suspension shock characteristic, sensing displacement of cantilevered distal portion of said suspension with a sensor that measures the distance of distal portion movement, and determining the suspension shock characteristic from said displacement measurement.

9. The method according to claim 8, including also mounting a sensor on said rotatable structure engaged with said distal portion for rotation with said structure in distal portion displacement sensing relation.

10. The method according to claim 8, including also mounting a plurality of said suspensions and sensors to said rotatable structure for simultaneous shock characteristic determination.

11. The method according to claim 8, including also engaging said sensor with said distal portion for displacement sensing.

12. Apparatus for determining the shock characteristic of a suspension having a fixed proximate portion, a cantilevered distal portion and a spring portion therebetween and in which displacement of said distal portion relative to said proximate portion under centrifugal force is a function of said shock characteristic, said apparatus comprising a rotatable structure that mounts said suspension by its said proximate portion for rotation therewith under centrifugal force, and a displacement sensor mounted to said rotatable structure in distal portion displacement sensing relation, said sensor sensing the displacement of said distal portion under said centrifugal force.

13. The apparatus according to claim 12, in which said suspension base portion is fixed to said rotatable structure for rotation therewith.

14. The apparatus according to claim 12, in which said sensor engages said distal portion in displacement sensing relation.

15. The apparatus according to claim 12, in which said sensor is carried on said rotatable structure.

16. The apparatus according to claim 12, in which said suspension is supported by said proximate portion fixed on said rotatable structure in distal portion cantilevering relation, said sensor is fixed on said rotatable structure arranged to sense displacement of said distal portion under centrifugal force generated by rotation of said structure.

17. The apparatus according to claim 12, in which plurality of said suspensions is carried on said rotatable structure for shock characteristic determination simultaneously.

18. An apparatus for determining the shock characteristic of a suspension having a proximate portion, a distal portion and a spring portion therebetween, said apparatus comprising a rotatable structure having a mount for said suspension base portion such that said distal portion is cantilevered over said rotatable structure, and a sensor carried on said rotatable structure for sensing the displacement of said distal portion relative to said proximate portion under shock load from centrifugal force imparted to said suspension from said rotatable structure.

19. The apparatus according to claim 18, in which said rotatable structure has a plurality of said mounts for mounting a plurality of said suspensions to said rotatable structure.

* * * * *